US005375369A

United States Patent [19]
VerHoeve

[11] Patent Number: 5,375,369
[45] Date of Patent: Dec. 27, 1994

[54] LANDSCAPE EDGINGS WITH STAKEABLE CONNECTORS

[76] Inventor: Daniel L. VerHoeve, 5205 W. 43rd St., Houston, Tex. 77092

[21] Appl. No.: 871,022

[22] Filed: Apr. 20, 1992

[51] Int. Cl.⁵ .............................................. A01G 1/00
[52] U.S. Cl. ................................................... 47/33
[58] Field of Search ................ 52/102; 47/33; 404/7, 404/8; 446/111, 112, 127

[56] References Cited

U.S. PATENT DOCUMENTS

| | | | |
|---|---|---|---|
| 352,146 | 11/1886 | Oungst | 47/33 |
| 1,281,856 | 10/1918 | Shaw | 446/112 |
| 1,414,593 | 5/1922 | Sklenka | 47/33 |
| 2,877,600 | 3/1959 | Slate | 47/33 |
| 3,559,338 | 2/1971 | Klingberg | 47/33 |
| 3,724,128 | 4/1973 | Tabone | 47/33 |
| 3,951,294 | 4/1976 | Wilson | 47/33 |
| 4,278,364 | 7/1981 | Frehner . | |
| 4,391,077 | 7/1981 | Giess . | |
| 4,543,745 | 10/1985 | Beck | 47/33 |
| 4,599,837 | 9/1983 | Wrightman . | |
| 4,601,140 | 4/1985 | Russo . | |
| 4,679,367 | 8/1985 | Geisthardt . | |
| 4,761,923 | 8/1986 | Reum . | |
| 4,804,350 | 2/1989 | Chen | 446/127 |
| 4,809,459 | 10/1986 | Brylla . | |
| 4,823,521 | 4/1989 | Kontz, Jr. | 47/33 |
| 4,834,585 | 5/1989 | Hansenwinkle . | |
| 4,858,379 | 2/1988 | West . | |
| 4,897,955 | 12/1988 | Winsor . | |
| 4,905,409 | 11/1987 | Cole . | |
| 4,910,910 | 10/1988 | Jones . | |

FOREIGN PATENT DOCUMENTS

| | | | |
|---|---|---|---|
| 0058126 | 8/1982 | European Pat. Off. | 446/111 |
| 2549185 | 5/1976 | Germany | 446/127 |
| 1784713 | 9/1978 | Germany | 446/111 |
| 110004 | 10/1964 | Netherlands | 47/33 |
| 1261528 | 1/1972 | United Kingdom | 446/111 |

Primary Examiner—Ramon S. Britts
Assistant Examiner—Joanne C. Downs

[57] ABSTRACT

A specialized doubly tongued stake is designed and engineered to align, connect and ground-anchor post or block-like elements in the creation of one-element-high, one-element-thick, stakeable landscape edgings. Each landscape element is channeled with a tongue-locking keyway on each of two parallel, opposed side edges. The elements may be chained into continuous aligned arrangement by the intermediate insertion of the stakes so as to form long flexible landscape edging segments which may be then be staked to the ground in the creation of permanently aligned edging structures. Each landscape edging element is thus doubly staked to the ground with the number of stakes and staked elements being substantially equal.

8 Claims, 4 Drawing Sheets

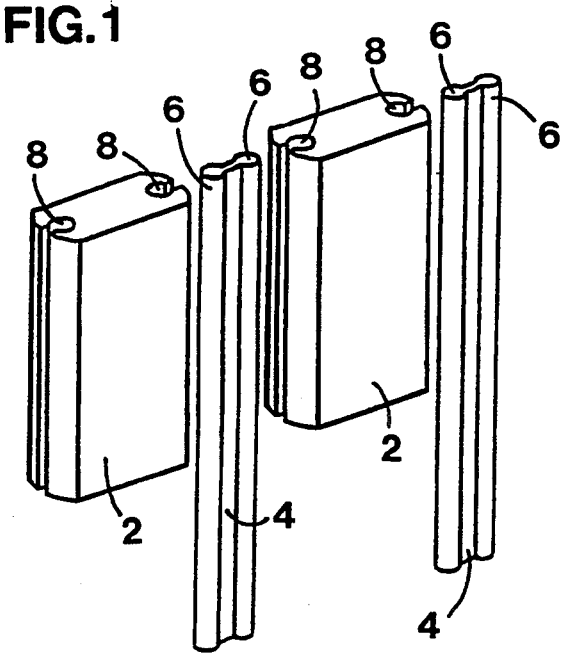
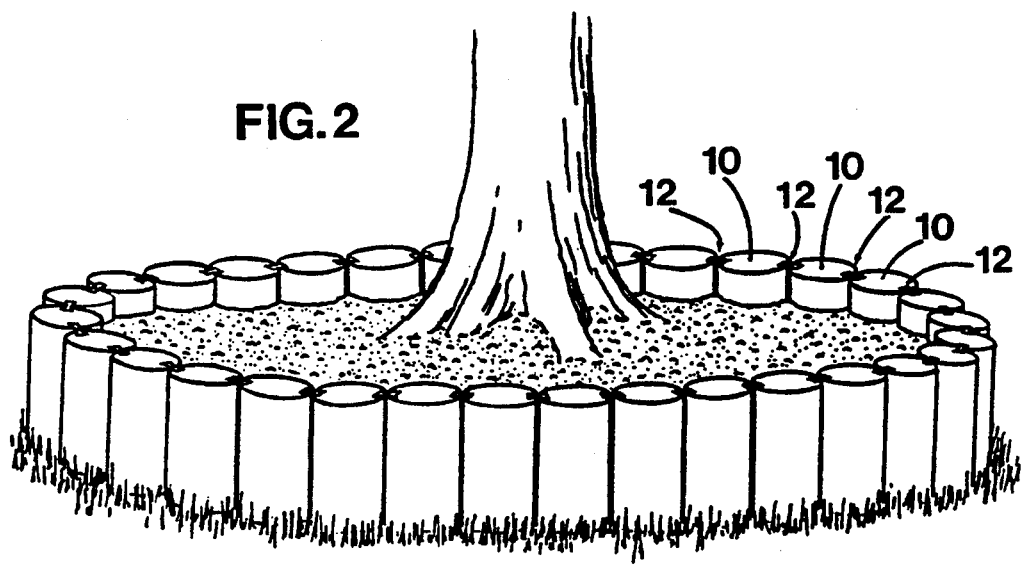

FIG.5
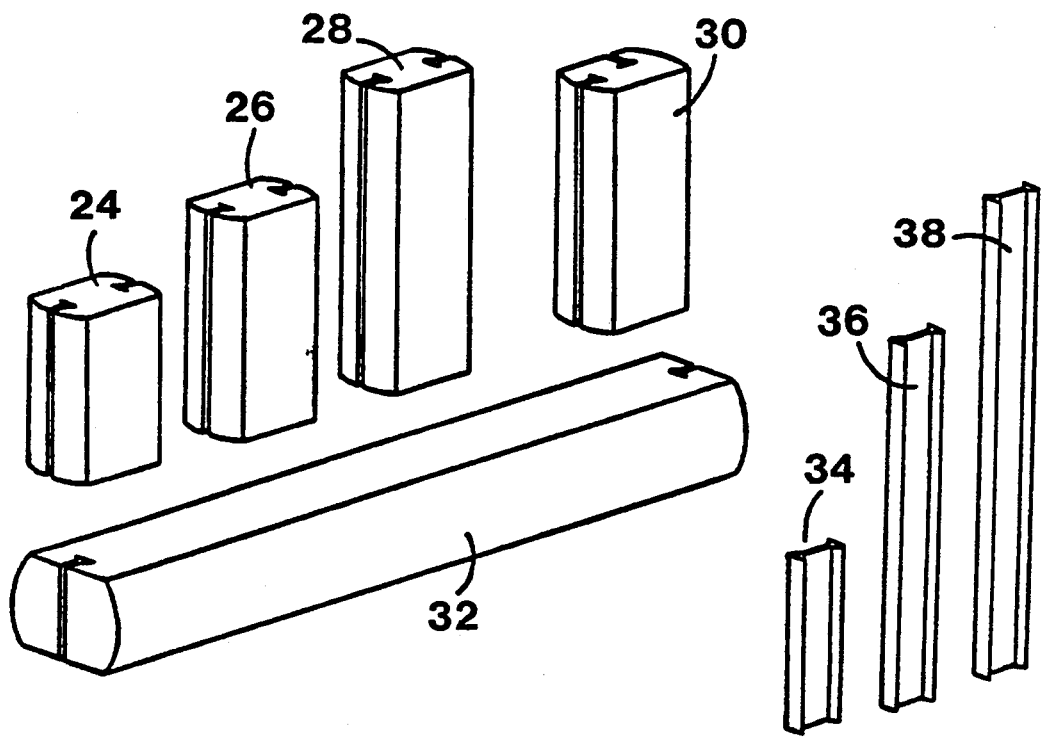
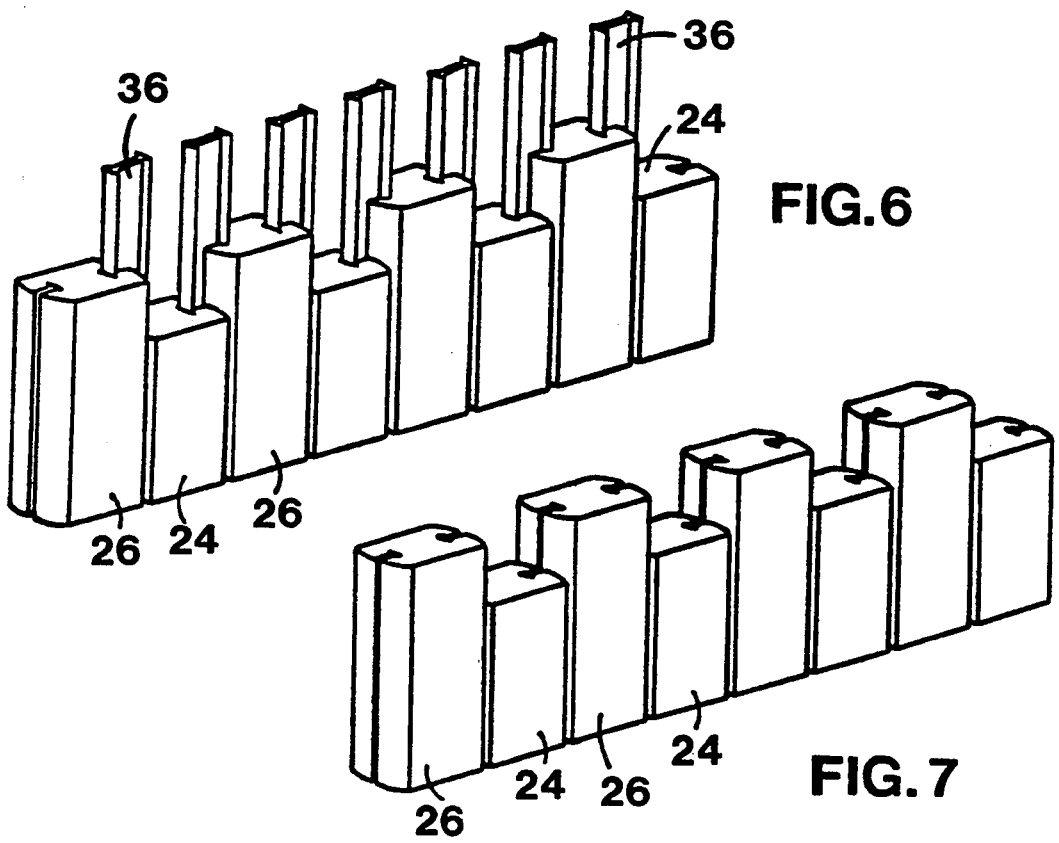
FIG.6
FIG.7

LANDSCAPE EDGINGS WITH STAKEABLE CONNECTORS

BACKGROUND—FIELD OF THE INVENTION

This invention relates to landscape edging, specifically concrete, brick or wood landscape edgings comprised of block or post-like elements in side-by-side (not stacked) arrangement.

Heretofore, landscape edgings of this type required a substantial portion of each element to be buried so as to hold the element upright. Whereas this is less of a problem with very slender elements which can be pounded into the ground with a hammer, the more elegant, massive elements commonly preferred must be set into a deep trench and back-filled with earth to keep them upright. This is especially true when the landscape edging is intended to withhold substantial amounts of garden soil, since the weight of the soil tends to push the elements out of plumb. A related problem is alignment. A single block or post which is leaning is visually obvious among other adjacent elements which are not leaning. Yet another problem is roots or rocks, which may make trenching very difficult indeed.

In the southern U.S., where heavy rains and grass species that spread by roots rather than seeds are common, landscape edgings of this type are commonly used to raise the garden level so as to give garden plants good drainage, as well as to combat grass encroachment. Such edging structures in a state of disrepair are a very common sight, probably more so than edging structures with all the elements in plumb alignment, as they were originally.

A great many products are currently on the market which seek to address these problems. Stakes are supplied with some very short or light-duty edgings, but these are generally rather cheap and obviously only suited for decorative uses. The easier to solve alignment problem is generally dealt with by inconspicuously tying a number of elements together with wire or strips of metal or plastic. Unfortunately the entire group must still be installed in a sufficiently deep trench as to hold it plumb. Another approach is to provide each element (or group of connected elements) with tongue-and-groove joinery along the connective edges. Manufacturers of both scalloped concrete edging blocks and wooden edgings have used this technique. While this is helpful, it is no solution, as such edgings still lack tensile strength and still must be deeply inset in the ground.

Edgings of this type are also frequently constructed from short, site-cut vertically oriented lengths of landscaping timbers, railroad ties or other dimensioned lumber and may be "toe-nailed" together at the tops to help each stay in alignment.

The alignment problem, however, is just a symptom of the trenching and root problems since if each element were to be sufficiently ground-anchored it would not fall out of alignment in the first place. Most users who desire this style of landscape edging would, therefore, find a landscape edging which requires little or no trenching, can pass over troublesome roots or rocks, will stay in plumb alignment even when withholding garden soil and be easy to install extremely desirable.

OBJECTS OF THE INVENTION

Accordingly several objects and advantages of my invention are as follows:

to provide a landscape edging in the above mentioned style which may be installed with little or no digging;

to provide a landscape edging in which all of the elements will remain permanently aligned;

to provide an edging which may be installed over roots and rocks with greater ease;

to provide an edging which, although substantially above ground, will resist tipping under the weight of garden soil in raised garden beds.

Stated somewhat differently, one object of this invention is to provide an edging which is visually and structurally more significant per amount of earth displacement (and therefore effort) required for satisfactory installation.

The following are additional objects and advantages:

to provide a landscape edging comprised of easily handleable components;

to provide a landscape edging which can follow both curved garden boundaries and relatively steep slopes;

to provide a landscape edging in which each modular element may be doubly staked without requiring double the number of stakes as modular elements, to provide a landscape edging which may be moved, removed or repaired with minimum effort;

to provide an edging which requires a minimum of tools to install;

to provide an edging which may be marketed as a construction set in which the homeowner or landscaper may choose, from a variety of interchangeable components, the ones that best suit his/her needs;

to provide a landscape edging which is engineered to substitute in both function and appearance for edgings currently createable only by the labor intensive partial burial of side-by-side blocks or piles.

SUMMARY OF THE INVENTION

In accordance with the above mentioned objectives this invention utilizes a specialized stake which aligns landscape edging elements like a spline, holds them together like a connector, and may be then driven to anchor such elements. By inserting such a stake between each element of a landscape edging structure, each said element may be effectively doubly staked with the elements and stakes being approximately equal in number.

Each stake is essentially comprised of two opposed locking tongues. Each of these locking tongues are designed to be inserted endwise into a mating locking keyway. Each stake, and therefore each locking tongue as well, is substantially straight and smooth along its entire length. The locking tongues each have a profile which widens or angles so as to be held captive within such a mating keyway while still exhibiting a loose sliding fit. Dovetailed, forked, or "T" shaped tongues are ideal, although tongues with a full length fold, angle or barb will work as well. Each stake, having two such tongues in opposed arrangement, may engage two locking keyways at once. Therefore two appropriately channeled landscape edging elements may be connected by such a stake. Each stake also functions as a spline between the two connected landscape edging elements by holding the two elements in alignment along their entire respective connective edges.

Each stake is made of an impact resistant material, said material also preferably being resistant to decay from exposure to the elements or partial burial. Each stake must also be sufficiently long so as to fully engage the elements and enough earth to hold the stake (and, therefore, any engaged elements) upright.

Although this invention may, on one hand, be viewed as a connector/spline/stake, it may also be viewed in terms of the landscape edging in which it is meant to be used. Landscape edging elements which have been modified for use with the above mentioned stakes are herein referred to as modules.

Logic dictates that each module be sufficiently massive so as to not be easily staked itself. The base area of each module must be at least 2.5 inches. This number enables the inclusion of modules made from vertically oriented 1×4 lumber, this being the smallest module considered practical by the inventor. The actual thickness of 1×4 lumber is 0.75 inches, representing the least possible depth (front to back thickness) of a module. The actual width of such lumber is 3.5 inches, and this is roughly the smallest contemplated width for a module as well. Any less width would require an excessive and impractical number of both modules and stakes per given length of edging structure. The minimum height for a module is 3 inches, since doubly staking shorter modules, which can not retain substantial amounts of soil, is impractical as well. Volumetrically, any module of less than 6 cubic inches is undoubtably easier to install by other Modules also have upper limits as to their size and mass, since excessively tall edgings would be better described as earth retaining walls or fences, and edgings thicker than a railroad tie are seldom, if ever, seen. The greatest contemplated width of a module (as viewed from the front) is four feet, as excessively wide modules limit the number of stakes employable and limit the curvability of the landscape edging. Excessively massive modules also are much harder to transport and assemble.

The modules may be constructed from concrete, lumber or fired clay, (brick) these being the major traditional exterior building materials of sufficient mass and formability for such use. Materials such as plastics may also be employed when specifically shaped and colored to imitate one of the above mentioned materials.

Each module must have two straight vertical "through-cut" locking keyways which separate the front of the module from the back and a flattened base portion normal to the keyways on which it may rest, so that two modules may be positioned keyway to keyway on the ground thus creating a passageway between them in which a stake may be inserted.

The stakes and modules are alternately arrangeable in the creation of one-module-high, one-module-thick landscape edging structures which are self-aligning, exhibit tensile strength and allow vertical adjustment of both said stakes and said modules. Such an assembled landscape edging structure will be substantially self-supporting during the layout phase and will tend to hold all stakes plumb, parallel and ready to drive. By holding a single stake of an assembled edging segment plumb, many other stakes and modules are held plumb as well. This is true even when the segment is laid over hills or valleys and around curves. The finished edging structure will be easy to disassemble or repair if necessary. Such structures have the traditional, elegant, massive appearance of medium to heavy-duty landscape edgings which are presently extremely difficult, and therefore expensive, to install or repair. When greater strength is required, such structures, by requiring less earth displacement per running foot, may be much more deeply anchored and therefore more structurally sound per amount of installation effort as compared with the present "state of the art" landscape edgings.

BRIEF DESCRIPTION OF THE DRAWINGS

FIG. 1 is an isometric view of a module and a stake.

FIG. 2 is an isometric view of a finished landscape edging structure.

FIG. 5 is an isometric view of an embodiment which includes a variety of both modules and stakes.

FIG. 6 is an isometric view of an assembled but unstaked edging segment created from the elements pictured in FIG. 5.

FIG. 7 is an isometric view of the segment shown in FIG. 6 which has been staked.

DESCRIPTION OF PREFERRED EMBODIMENT

Figure 3:
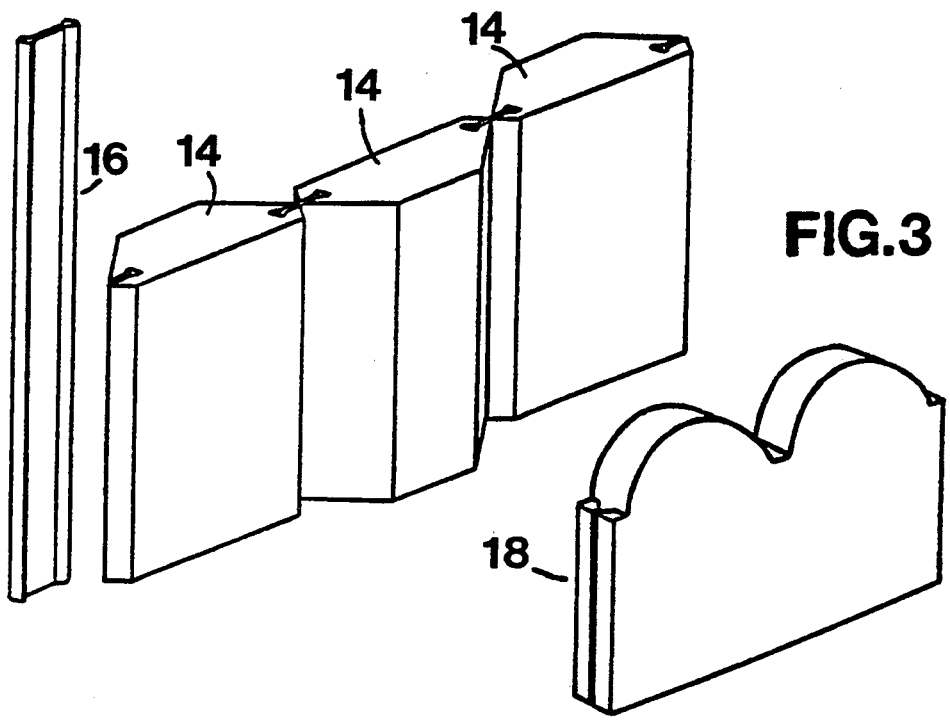
FIG. 3 is an isometric view of showing several shapes adaptable for use as modules for the present invention.

Referring first to FIG. 1 the defining characteristics of the present invention will be disclosed. Module 2 represents the basic block or pile-like element of which edging structures, as defined by this invention, are composed. Stake 4 is fitted with two locking tongues 6 which are engageable with locking keyways 8 to produce a loose sliding fit. Modules 2 may be interlocked in repeating fashion to produce landscape edging segments in a variety of lengths.

FIG. 2 shows an installed edging structure. Modules 10 have the appearance of deeply buried piles but in reality are simply cylindrical blocks resting on the ground. Each doubly dovetailed stake 12 interlocks with two modules 10 to connect and align them. In this way each module 10 may be both doubly staked and aligned without requiring twice the number of stakes as modules, as might be expected.

In a circular structure as shown in FIG. 2 the ratio of modules to stakes is one to one. In a linear structure, with two ends, the ratio is still approximately equal but with one extra stake. This reduction in the number of stakes is extremely significant, especially in situations where tree roots are present, such as in this illustration.

The edging structures built utilizing the present invention have tensile strength. In structures where the edging curves around elevated soil levels this is of great relevance, since the anchoring requirements are minimized by the tensile strength of the structure itself. The circular structure shown in FIG. 2 is virtually self anchoring, requiring very little ground penetration by stakes. This fact suggests that stakes may be made in a plurality of lengths and that, at least in certain circumstances, shorter stakes may be used in place of longer ones. In the case of the structure illustrated by FIG. 2, for example, short stakes may be used when a root prohibits the use of a longer one.

FIG. 3 shows yet another embodiment in which the modules 14 have differing fronts and backs, although they are reversable. Stake 16 is made from rigid plastic or metal and is also engageable with concrete module 18, demonstrating the range of materials and shapes which may be employed in the creation of modules for this invention. The comparability of stake 16 to both modules 14 and 18 demonstrates that a single stake may join quite different styles of modules, so that a single embodiment of this invention may enable the construction of a plurality of styles of landscape edging structures.

Figure 4:
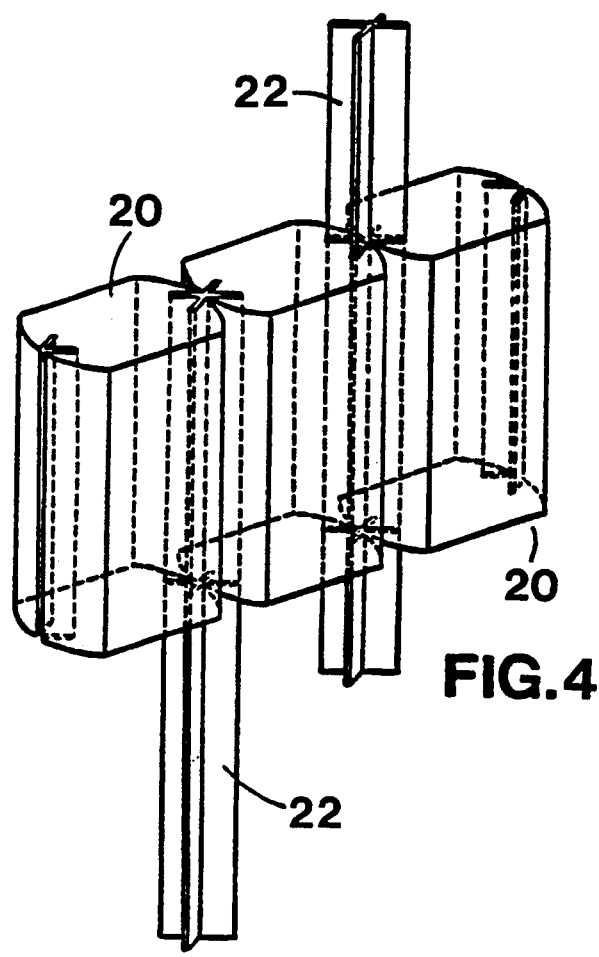
FIG. 4 is a see-through isometric view of yet another embodiment of the present invention, showing an extruded X-shaped stake.

Referring next to FIG. 4 yet another embodiment of the "butterfly" stake is illustrated. Modules 20 are joined by stake 22 which is formed by extruded plastic or aluminum. Notable is the fact that stake 22 is functionally identical to dovetailed stake 12, but with all redundant mass removed, (this mass being redundant by virtue of the superior strength of plastics or metals over wood).

FIG. 5 illustrates a more versatile embodiment of the present invention. Modules 24, 26, 28, 30 and 32 represent short lengths of dimensioned treated lumber. Stakes 34, 36 and 38 are intended to be choosen as structural requirements dictate, with stake 34 being for use only when roots or rocks prevent the installation of a longer stake.

FIG. 6 illustrates a sample edging segment creatable from several of the elements shown in FIG. 5 which has been assembled and positioned but not yet staked. It may be seen that modules 26 and 28 jointly form parallel guiding channels through which stakes 36 may be driven. It is notable that the edging segment has tensile strength even at this stage of construction, and may be positioned or repositioned very easily. It may also be "tacked" in place while additional modules are added.

FIG. 7 shows the previously described edging segment after installation. The stakes have been driven so as to be out of sight. In order to remove this segment, modules 26 and 24 may be simply lifted up and away, re-exposing the stakes which may then be grasped and pulled out of the ground. It may therefore be seen that this landscape edging is very easy to repair or modify.

Figure 8:
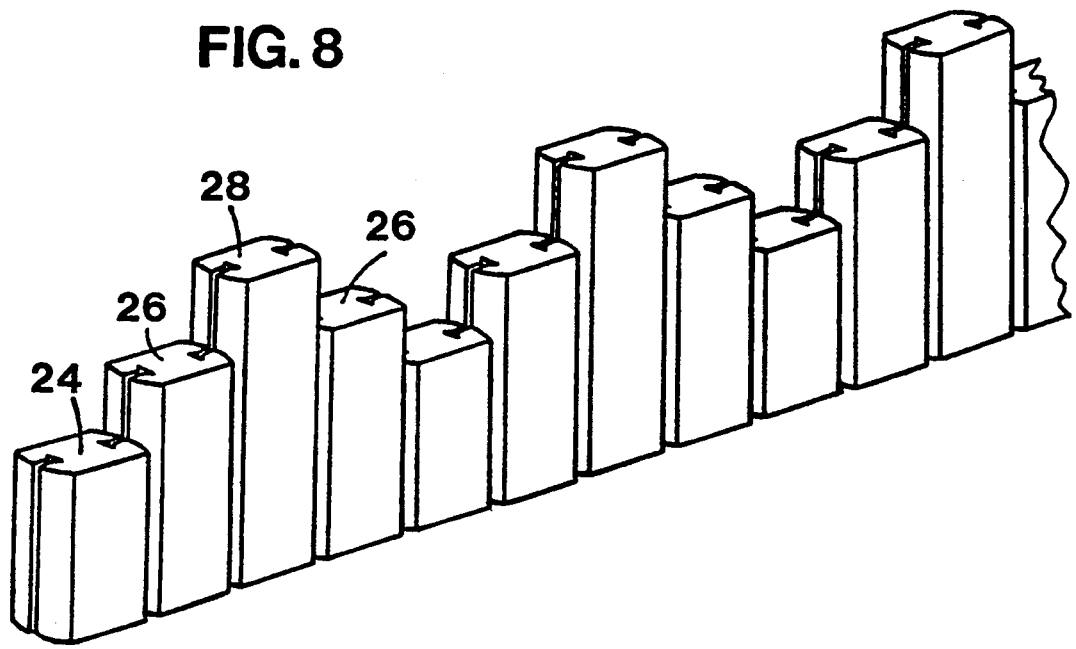
FIG. 8 is an isometric view of another edging segment constructable from the elements shown in FIG. 5.

FIG. 8 shows an additional style which is constructable from the elements illustrated in FIG. 5.

Figure 9:
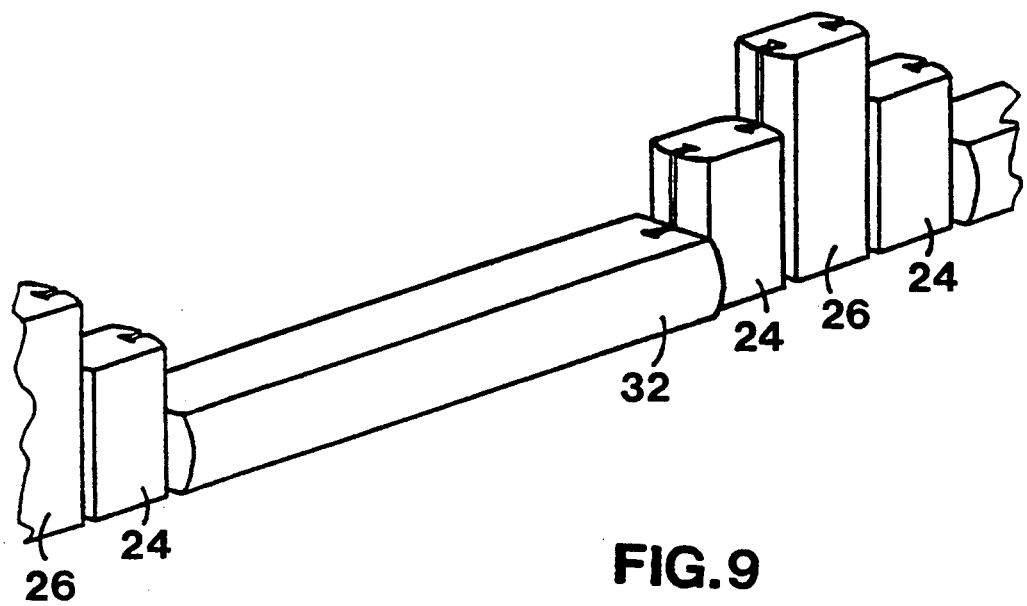
FIG. 9 is an isometric view of yet another edging segment constructable from the elements shown in FIG. 5.

FIG. 9 shows yet another style of edging which utilizes elements from FIG. 5. While a detailed disclosure is provided herein of the preferred embodiment, many changes and modifications may occur to those skilled in the art. All such changes and modifications are intended to be included within the following claims.

I claim:

1. A decorative landscape edging comprised of stakes and modules;

said modules each having a block or post-like shape with a volume of at least six inches;

said modules each having a height than three inches;

said modules having a width greater than three inches;

said modules having a depth equal or greater than 0.75 inches;

said modules having a base area of at least 2.5 square inches on which it may rest;

said modules each having two straight, vertical, through-cut, parallel opposed locking keyways normal to said base area which define two connective sides, said connective sides separating front from back;

said modules being made from a deterioration and impact resistant material;

said stakes being fitted with two opposed locking tongues, said tongues being mating and interlockable with said locking keyways so as to create a loose sliding fit;

said stakes being at least 25% longer than said locking keyways;

said stakes and said modules being alternately arrangeable in the creation of one-module-high, one-module-thick, tip-resistant landscape edging structures which are self-aligning, exhibit tensile strength and allow vertical adjustment of both said stakes and said modules, whereby an assembled landscape edging structure will be substantially self-supporting during the layout phase and hold all stakes plumb, parallel and ready to drive.

2. A landscape edging as in claim 1 which includes interchangeable modules of a plurality of predetermined sizes or shapes for arranging in repeating decorative patterns of the users design.

3. A landscape edging as in claim 1 which includes concrete modules.

4. A landscape edging as in claim 1 which includes modules fashioned from vertically grained lengths of predimensioned lumber.

5. A landscape edging as in claim 1 which includes wooden stakes treated with a preservative compound consistent with below ground use.

6. A landscape edging as in claim 1 which includes metal stakes.

7. A landscape edging as in claim 1 which includes plastic stakes.

8. A landscape edging as in claim 1 which includes stakes in a plurality of lengths;

whereby the user may use a shorter stake when subterranean obstacles prevent use of a longer stake;

whereby the user may user a longer stake if deemed prudent for support reasons.

* * * * *